United States Patent [19]

Kumakawa

[11] 4,173,287
[45] Nov. 6, 1979

[54] METHOD OF MAKING BOARDS AND PACKING CASES MADE THEREFROM

[76] Inventor: Shozo Kumakawa, 175-1, Nishinonami cho, Hikone City, Shiga Prefecture, Japan

[21] Appl. No.: 800,223

[22] Filed: May 25, 1977

[30] Foreign Application Priority Data

May 25, 1976 [JP] Japan .................................. 51-60979

[51] Int. Cl.² ............................................. B65D 9/32
[52] U.S. Cl. ...................................... 217/65; 52/284; 217/12 R; 403/231; 403/381
[58] Field of Search ............... 217/12 R, 65; 220/4 F; 52/590, 284; 46/30, 31; 403/231, 381; 144/321, 323, 326 R, 314 B, 318, 319

[56] References Cited

U.S. PATENT DOCUMENTS

| 3,591,212 | 7/1971 | Rhyne | 217/65 |
| 3,692,201 | 9/1972 | Garduna | 217/65 |

FOREIGN PATENT DOCUMENTS

| 18920 | of 1899 | United Kingdom | 217/65 |
| 729062 | 5/1955 | United Kingdom | 217/12 R |

Primary Examiner—Allan N. Shoap

[57] ABSTRACT

Boards for wooden packing cases with the shape of a parallelepiped, having connecting elements in the form of tenons and mortises that alternate at regular intervals on the edges of the rectangular hexahedron thereof. Each edge is connected with the others by the tenons and mortises. The pitches of these elements are calculated according to the invention from the overall lengths of the respective edge by a novel method so that the mortise-and-tenon connections have bilateral symmetry about a central point of the overall lengths of the edges. A plurality of the connections has an equal basic pitch in a bilaterally symmetrical arrangement, and the invention provides either a pair of tenons (or mortises) at the ends of the edges or a single tenon (or mortise) at the center, with a different pitch, calculated by the novel method. In addition to the novel boards and the method of making the same, the invention also relates to packing cases made therefrom.

4 Claims, 10 Drawing Figures

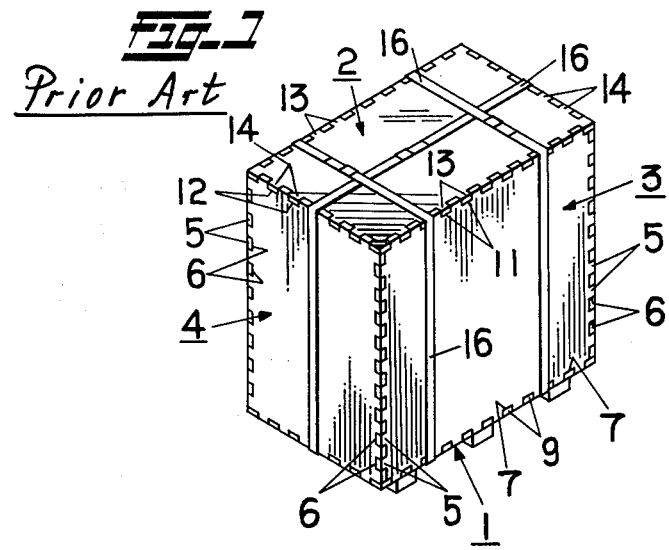
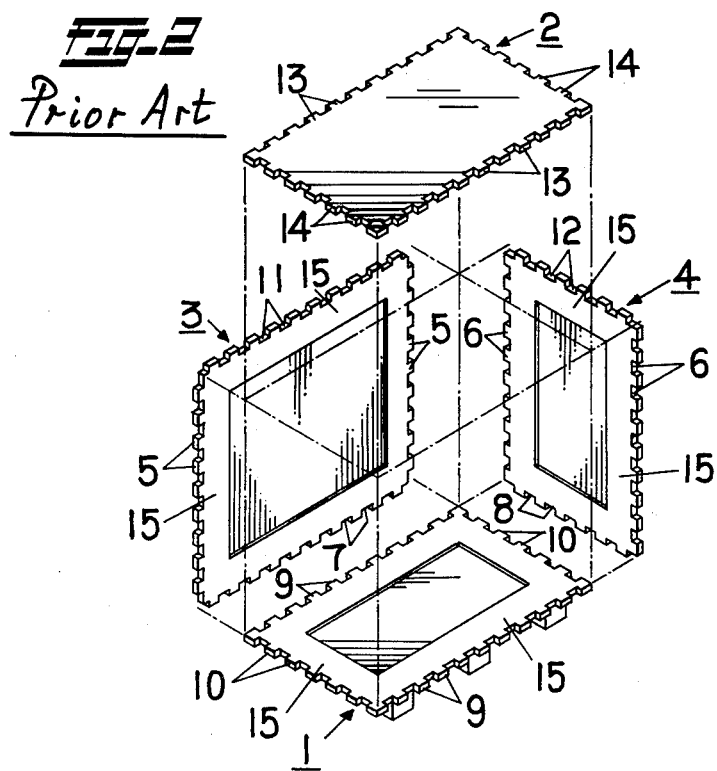

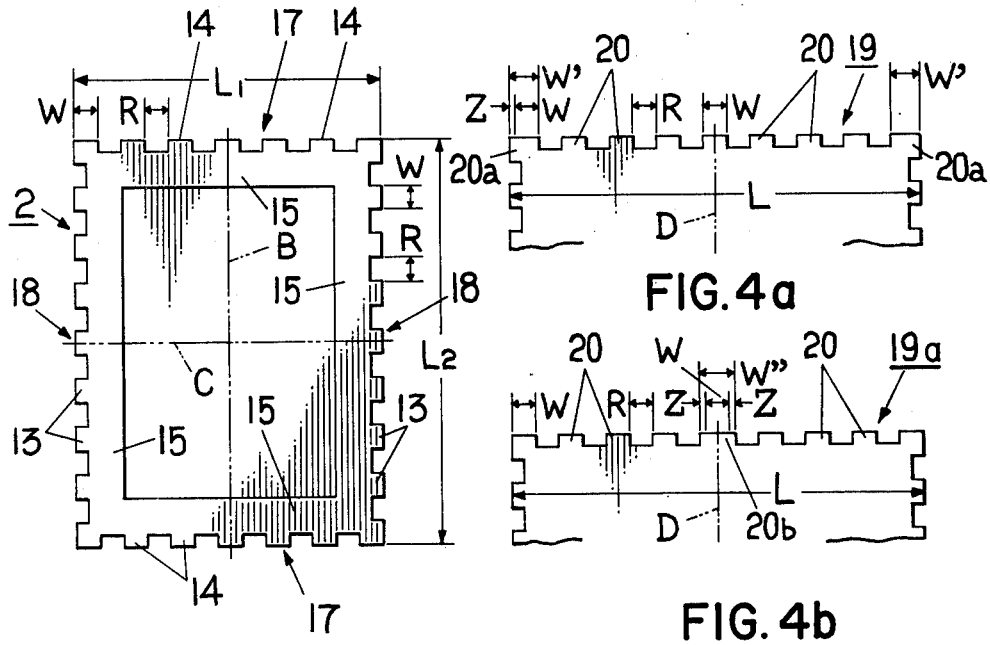
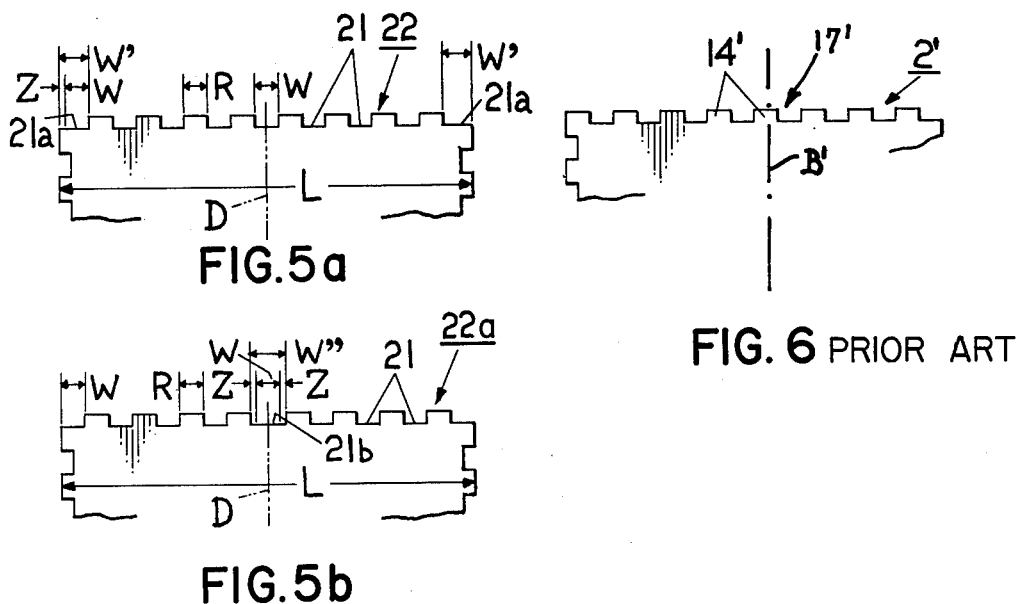
FIG. 3 PRIOR ART
FIG. 4a
FIG. 4b
FIG. 5a
FIG. 5b
FIG. 6 PRIOR ART

METHOD OF MAKING BOARDS AND PACKING CASES MADE THEREFROM

The present invention relates to boards for wooden packing crates or cases, the method of making the boards, and the packing cases themselves. The boards are characterized in that connecting means are provided with elements in the form of mortise-and-tenon joints along one or more connecting edges of the boards, in a manner such that the reverse sides of the boards can be used as well as the usually exclusively used obverse sides.

In constructing boards into packing cases, workers must conventionally be careful to make them engage sufficiently in such a manner that the mutually opposed parts properly interengage. In the hitherto known conventional methods it was necessary for the workers to make sure which sides of the boards are the obverse or the reverse sides because the engagement parts were not bisymmetrically formed widthwise about the center lines of the boards; extra time is consequently lost when assembling the boards into packing cases according to hitherto used conventional methods.

It is therefore the major object of the present invention to provide boards, as well as a method of making the same, which can be assembled quickly and easily by mating the respective engaging portions, without the necessity of checking the obverse and reverse sides of the boards, or of turning them around before assembly.

In accordance with the main features of the present invention, the engagement means, such as tenons and mortises, are widthwise formed bisymmetrically about a center point or center line of each board so that the arrangement is entirely equal for both the obverse and the reverse sides of all boards.

In the conventional manufacture of packing cases it has been rather difficult to evaluate the proper pitch and the length of the tenons and mortises that constitute the connecting means for the boards, namely along their margins, because the pitch has to be provided uniformly over the total length of each board, requiring sometimes that the length and/or the pitch be modified of at least some mortises and tenons.

In contradistinction, the present invention in its structural and procedural aspects is characterized in that the lengths of the tenons and mortises as well as their pitch are predetermined as required by a division, the remainder being divided by two to constitute a factor when the total length cannot be divided with the desired pitch without a remainder, to add the value to that of any mortise or tenon. This results in an arrangement whereby the tenons and mortises are widthwise symmetrical about the center line over the total length or edge of the respective board.

As a result, the boards for packing cases can be manufactured according to this invention very quickly and easily, with predetermined lengths and pitches of the engaging tenons and mortises.

Accordingly, the invention relates to boards and to packing cases made therefrom, preferably of wood, having at least one edge provided with connecting means constituted by successive elements in the form of the earlier-mentioned tenons and mortises, for mating with similar elements of other boards, wherein all elements have a bilateral symmetry along the edge, a plurality of the elements having an equal basic pitch for the tenons and mortises while one additional, symmetrical element is (or two such elements are) provided with a different pitch. The connecting elements have a maximum integral odd number which is derived by dividing the overall length of the edge in question by the basic pitch, the different pitch being derived by adding a factor to the basic pitch, which corresponds to half the remainder of the preceding division, as mentioned earlier.

If a pair of additional connecting elements is used, they are at the ends of the edge, and the different pitch is calculated to include the factor. If only one such additional element is used, it is in the center of the edge, and then the different pitch is made to include twice the value of the factor.

Other objects, features and advantages of the invention will become better understood from the detailed description that follows, with reference to the accompanying drawings, wherein FIG. 1 is a perspective view of a packing case constructed by ordinary mortise-and-tenon joints, into which some details have been introduced for a better understanding of the invention;

FIG. 2 is an exploded perspective view of the packing case of FIG. 1, similarly with additions to explain the invention;

FIG. 3 is a front elevation of an exemplary board, namely a lid, of the case of FIGS. 1 and 2;

Figure 7:
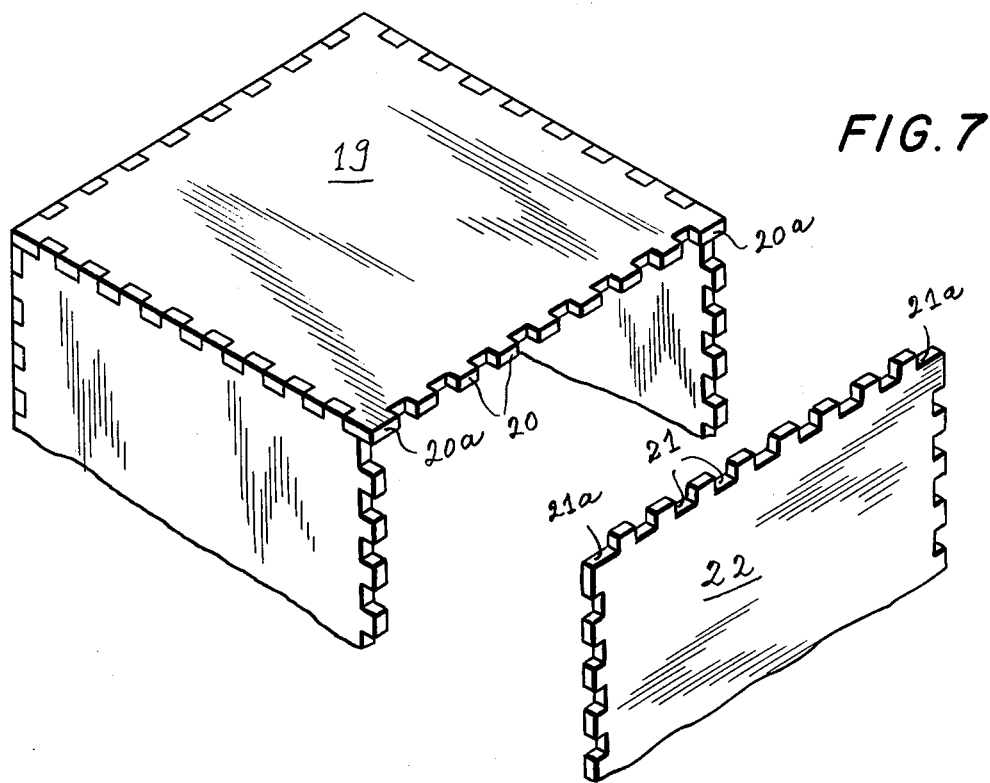
Figure 8:
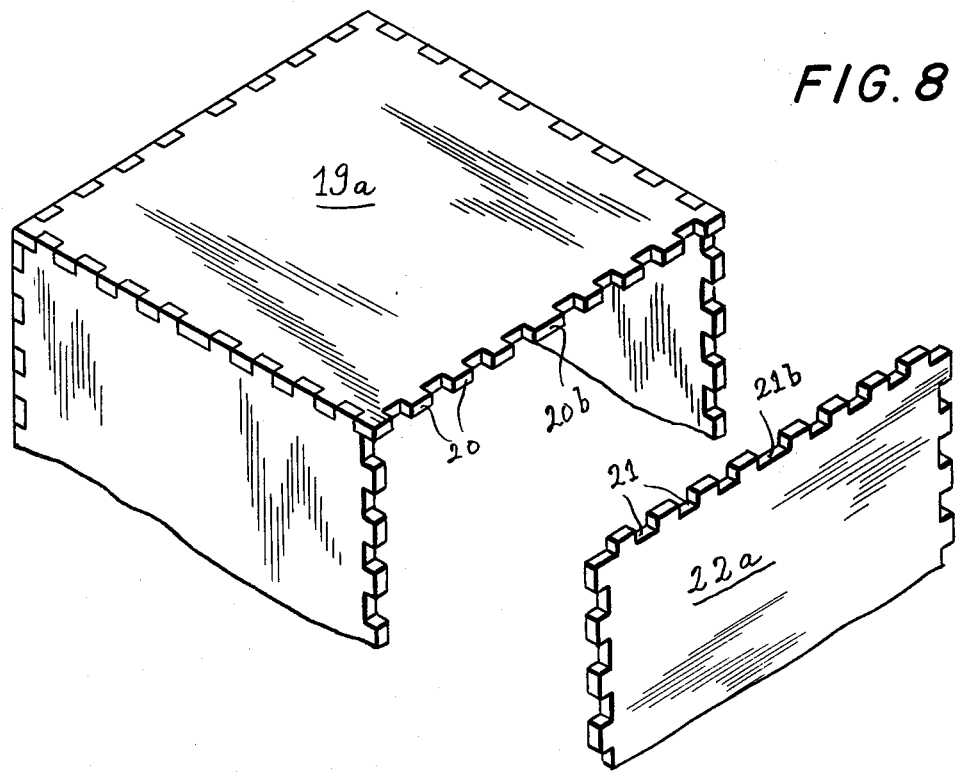

FIGS. 4 (a) and 4 (b) illustrate the construction of novel joints in a board according to the present invention, to be used for packing cases, regular and additional tenons being formed alternatively on the edges and the centers of the boards;

FIGS. 5 (a) and 5 (b) illustrate other inventive joints wherein regular and additional (peripheral and central) mortises are used;

FIG. 6 shows the construction of a connecting edge of a board of the prior art, whose reverse side cannot be used, all of FIGS. 4 . . . , 5 . . . and 6 being partly broken away; and FIGS. 7 and 8 are partly assembled but incomplete views (similar to FIG. 2) of packing cases according to the invention, respectively incorporating the novel joints of FIGS. 4 (a) and 5 (a), and 4 (b) and 5 (b).

Most packing cases of the conventional type are made of wood. Such cases are generally hammered together, e.g. with nails, so that opening the cases necessarily involves a destructive operation so that usually the wooden cases become useless to the extent that the constituting boards cannot be re-used any more.

The present invention provides new boards from which a new type of cases can be assembled in which, as additionally shown in FIGS. 1 and 2, engagement means, for example interengaging mortise-and-tenon joint elements are formed, as will be explained hereinafter, on connecting edges of usual constituting boards 1 to 4, namely a base board 1, a lid or top board 2, lateral walls or boards 3, and side planks or boards 4. These can be easily assembled and later disassembled, if necessary. It will be understood that the term "boards" will relate in subsequent portions of the description to the earlier-mentioned base and top boards, lateral and side boards, and similar other parts of packing cases, as are conventionally used in wooden cases.

Tenons 5 are included in the illustrations of the prior-art cases (in FIGS. 1 and 2) for the lateral boards 3, engaging respective mortises 6, both on the respective right- and left-hand edges of the boards 3 and 4. These boards are constructed as squares, as a result of meeting at right angles in such a manner that the boards 3, 4 can be easily assembled and disassembled.

The drawing furthermore shows mortises 7, 8 at the lower edges of the lateral boards 3 and the side planks 4, to engage respective tenons 9, 10 which are provided at the right- and left-hand edges, respectively, as well as on the front and rear edges of the base board 1. Thus the latter is connected with the bottom edges of the boards 3, 4.

Furthermore, mortises 11, 12 are provided on the upper edges of the boards 3, 4, engaging tenons 13, 14 at the front and rear edges, as well as the right- and left-hand edges of the lid or board 2, respectively. The lid is connected with the upper edges of the boards 3 and 4, as shown.

In this way the base 1, the lid 2, the boards 3 and the planks 4 form a substantially rectangular hexahedron. In FIG. 2, numeral 15 designates ribs that are provided in any, in pairs, or all of the boards 1 to 4. These details can of course form part of the novel, modified, inventive boards and cases, as will be seen from the description that proceeds hereafter.

As shown in FIG. 1, the prior-art wooden case and its boards are actually fastened lengthwise and crosswise on circumferential surfaces, from the directions of the boards 3 and 4, namely with elongated, narrow strips 16 which are usually provided in the form of wires, iron hoops, tapes and the like so that the adjacent edges of the boards 2, 3 and 4 are held together and fixed in this relationship.

Since a case constructed of such boards and parts includes the engagement of all edges of the earlier-mentioned boards 1 to 4, constituting a rectangular hexahedron, the case can be put together in a simple manner, each board being capable of separation from any or all other board(s) with a view to disassembling the case, if needed, without damaging or destroying the boards, when knocking the case down, and accordingly the case modified and constructed according to the present invention endures repeated use, practically to an unlimited extent.

It is advantageous that the reverse sides of the boards, for example of the base 1, the lid 2, etc., may be used selectively, as well as the obverse sides, as will be explained later, to assemble cases of the type as shown in FIGS. 1 and 2. The reason is that it is possible, as a result of the provisions of this invention, to construct the packing case without the necessity of checking which is the obverse side or the reverse side of each board used in the case. A condition to guarantee this advantageous feature of the invention is that, taking the lid board 2 as an example, each pair of tenons 13, 14 is formed bisymmetrically about center lines B, C (see FIG. 3) at connecting edges 17, 18 of the board 2.

When the tenons 13, 14 are formed bisymmetrically as just explained it is of course possible to use the reverse sides of the lid 2 (and of all other boards so constructed, in accordance with the invention), as well as their obverse sides, selectively and repeatedly.

Generally speaking, in such a case, the width W of a tenon (e.g. 13) equals that of a mortise (for example 6, 11 or 12, see FIG. 2, where the mortise 11 of the lateral board 3 meets the tenon 13 of the lid 2). According to the invention, each tenon is formed with a pitch that equals the width R of a mortise 11 or 12 (see again FIG. 3), the latter equalling the width W of a tenon 13 or 14. Therefore, in order to realize the desirable symmetry as mentioned above, the lengths L1, L2 of the edges (for ex., of the lid 2 of FIG. 3) must include an odd multiple of the pitch R. However, as the lengths of the connecting edges depend upon the sizes of the objects to be packed in the cases, this is not an unavoidable condition, and it is not mandatory to have an odd multiple of the pitch R.

Referring now to FIG. 6, it was not possible so far in the prior art to realize the desirable symmetry because a lid 2', for example, could not be used obversely and reversely since an even number of tenons 14' was usually provided, at a connecting edge 17', such an even number being impossible in a bisymmetrical arrangement about a center line B'. Accordingly, with boards of the prior art as shown in this partial illustration, it was necessary that the worker ascertain which is the obverse and the reverse side of each board, necessitating that properly corresponding engagement means are located before assembling the packing cases. This is of course a disadvantage of the prior art, which is eliminated by the present invention.

While some of the so far described elements of the packing cases have been described in connection with the prior-art illustrations of FIGS. 1 through 3 and 6, the FIGS. 4 (a), 4 (b) as well as 5 (a), 5 (b) relate solely to the novel features of the boards and packing cases made in accordance with the present invention.

The novel method of constructing packing cases, embodied in the present invention, eliminates all the previously explained disadvantages. FIGS. 4 (a) and 4 (b) show end portions of respective boards 19, 19a made according to the invention, which could be used as a bottom, a lid, lateral or side plans, and the like, wherein the indicated length L of an edge at which connecting means, such as tenons 20 are formed, is not constituted merely by an odd multiple of the earlier-mentioned common pitch R of these tenons and mortises.

First the length L is divided by the pitch R, then a maximum available integral odd number X and a remainder Y are evaluated, then dividing Y by two so that a numerical value or factor Z is obtained. A width W' of a pair of additional tenons 20a results, these tenons being formed in FIG. 4 (a) at the left- and right-hand ends of the boards 19, flanking the tenons 20. The width W' is constituted by the numerical value of W+Z (the latter being equal to Y/2), as can be seen from the illustration.

In the alternative solution of FIG. 4 (b) according to the invention, the width W" of a single, different, additional tenon 20b is evaluated in the board 19a in such a manner that the value Z is added to both ends of the tenon 20b, plus W in the center, as it were, so that W"=W+2Z in this case (note that Z is equal to Y).

These important particulars of the invention can be seen respectively above the left-hand corner of FIG. 4 (a) and above the center of the illustration in FIG. 4 (b) in the respective, novel boards 19 and 19a.

As a matter of example, when L is 520 millimeters for FIG. 4 (a), R and W (the width L or the pitch) being 30 mm, the obtained maximum odd number is 17, evaluated by dividing L by R, the remainder (Y) being 10 mm, and thus the value of Z (half of Y) becomes 5 millimeters.

Adding this latter value (5 mm) to that of the width (30 mm) of the tenons 20a of FIG. 4 (a), their new value (W') becomes 35 mm each, which can be seen to be bigger than the original value. Thus, two of the possible total of 17 tenons will be used with the width W'=35 mm, identified as 20a, while the balance of 15 tenons will remain with the width W=30 mm, in the form of the original tenons 20.

Taking the other example, namely of FIG. 4 (b), the value of the width W" of the central tenon 20b is (30+10=) 40 mm.

It should be emphasized at this point that the example of FIG. 4 (a) has two additional tenons 20a, at the left- and right-hand ends of the board 19, which the example of FIG. 4 (b) has a single additional tenon 20b at the center of the illustrated top edge of the board 19a.

The just described two illustrations relate to the tenons, while similar considerations apply to mortises, for adjoining, complementary boards, as respectively shown in FIGS. 5 (a) and 5 (b) for regular mortises 21 in respective boards 22, 22a (the boards 19, 19a, 22, 22a of the inventive examples are of course the counterparts of the boards 2 of FIG. 3 and actually of all boards 1 to 4 discussed in the beginning).

In FIG. 5 (a), two additional mortises 21a are formed, again at the ends of the edge of board 22, while in FIG. 5 (b), a single, additional, central mortise 21b is intercalated in board 22a between the mortises 21.

The width W' of the mortises 21a (FIG. 5 (a)) is constituted by the value W+Z; on the other hand, the width W" of the mortise 21b (FIG. 5 (b)) is made equal to W+2Z, as aforesaid.

It should be understood from the preceding details that the respective tenons and mortises of the boards 19 and 22 interengage, when assembled, as can be seen by comparing the board edges of FIGS. 4 (a) and 5 (a) with FIG. 7. In a similar manner, the tenons and mortises of FIGS. 4 (b) and 5 (b) are those shown for the boards 19a and 22a of FIG. 8, these two figures (7 and 8) constituting partly assembled views of the packing cases according to the invention.

To give another example for the tenons of FIG. 4 (a), when L is 620 mm while R or W is 30 mm, the integral number becomes 20 which has been evaluated by dividing L by R, the remainder being 20. In this case it should be noted that the integral number 20 is not an odd number but an even one. Accordingly, in such situations the maximum "odd number" that can be evaluated after having made the division, namely the one nearest to the obtained number 20, is actually 19, to be used for making the boards in question. By this calculative change the remainder becomes 50 m (20+30, the omitted width), and accordingly the value of Z (upon division of Y by two) becomes 25 mm. Adding the latter value to that of the width (30 mm) of the tenons 20a, their new value (W") becomes 55 mm, which is bigger than the original one. Going back to the division of 620 by 30, the obtained even number (20) is reduced by one, namely to 19. From these, two special tenons 20a with W"=55 mm will be used, leaving 17 other tenons identified by numeral 20 with W=30 mm (which makes the total of 620 mm).

In the case of FIG. 4 (b), the value W" of the single special tenon 20b becomes 80 mm, and 18 (of the total of 19) tenons 20 will be regular (30 mm), giving the total of 620 mm. The same manner of calculation applies to the respective widths of the complementary mortises 21a and 21b of FIGS. 5 (a) and 5 (b).

In FIG. 7, the features of the partial (edge) views of FIGS. 4 (a) and 5 (a) are combined when assembling a packing case from boards such as 19 and 22, including complementary pairs of special tenons 20a and special mortises 21a.

FIG. 8, in a similar manner, shows part of a packing case where the novel edge arrangements of FIGS. 4 (b) and 5 (b) are combined, this time including in the boards 19a and 22a only one (centrally disposed) special tenon 20b and special mortise 21b for engagement therewith.

It can be seen from the preceding description that the invention allows to form tenons and mortises of boards for packing cases bisymmetrically about respective center lines. While the above examples and explanations followed proportions and details of the top board or lid 2, in respect of the boards numbered 19, 19a and 22, 22a, it will be clear to those skilled in the art that the inventive method and manner in which boards are made applies in an identical manner to all the boards 1 to 4 of the exempary packing case shown in the prior-art illustrations of FIGS. 1 and 2.

By way of summary it can be added that the structures of the connecting edges which have a bilateral symmetry about their respective center lines can be calculated, and the widths of the tenons and mortises evaluated thereby, which tenons and mortises constitute the connecting elements for the boards.

When manufacturing boards according to the present invention, packing cases can be produced, made of such boards, whose reverse sides can be used as well as the obverse sides. Such boards can be constructed easily and assembled into packing cases without the necessity of checking the orientation of the sides, and furthermore the boards can be used repeatedly with a presentable appearance, also by turning from the obverse side to the reverse side, if by any chance the former has become soiled, stained or might carry labels, non-removable written material (addresses, contents), and the like.

Those skilled in the art will appreciate that several modifications, departures from and additions to the disclosed boards and method of making them can be applied without departing from the spirit and scope of the present invention.

What I claim is:

1. A method of making boards (19, 22) for preferably wooden packing cases, comprising the steps of: providing a total odd number of successive connecting elements (20, 20a, 21, 21a) in the form of tenons (20, 20a) and mortises (21, 21a) with a bilateral symmetry along edges of the boards, each tenon and mortise of each edge of each board defining engaging means for mating with a corresponding, equally dimensioned mortise and tenon, respectively, of another equally dimensioned edge of another respective board to form a completed container; selecting an overall length (L) for each edge so that said length can be divided mathematically by a desired basic pitch (W) of the elements, leaving a remainder which is other than zero; providing in each edge a plurality of the elements (20, 21), odd in number, that have said basic pitch, as well as a pair of outermost, additional elements (20a, 21a) that have a different pitch (W'); deriving the number of the plurality of elements by dividing said overall edge length by said basic pitch to obtain, with the remainder that is other than zero, the highest possible quotient that is an integral multiple of said basic pitch; however, reducing the result of the division by one when the latter yields an even number and modifying the remainder of said result when an even number is yielded, by adding the basic pitch thereto; and deriving said different pitch by adding a factor (Z) to said basic pitch, which factor corresponds to half said remainder of the division, all numerical values being integers greater than zero.

2. A method of making boards (19a, 22a) for preferably wooden packing cases, comprising the steps of: providing a total odd number of successive connecting elements (20, 20b, 21, 21b) in the form of tenons (20, 20b) and mortises (21, 21b) with a bilateral symmetry along edges of the boards, each tenon and mortise of each edge of each board defining engaging means for mating with a corresponding, equally dimensioned mortise and tenon, respectively, of another equally dimensioned edge of another respective board to form a completed container; selecting an overall length (L) for each edge so that said length can be divided mathematically by a desired basic pitch (W) of the elements, leaving a remainder which is other than zero; providing in each edge a plurality of the elements (20, 21), even in number, that have said basic pitch, as well as a single, centrally disposed, additional element (20b, 21b) that has a different pitch (W''); deriving the number of the plurality of elements by dividing said overall edge length by said basic pitch to obtain, with the remainder that is other than zero, the highest possible quotient that is an integral multiple of said basic pitch; however, reducing the result of the division by one when the latter yields an even number and modifying the remainder of said result when an even number is yielded, by adding the basic pitch thereto; and deriving said different pitch by adding a factor (Y) to said basic pitch, which factor corresponds to said remainder of the division, all numerical values being integers greater than zero.

3. A packing case comprising boards (19, 22) with edges thereon that are provided with a total odd number of successive connecting elements (20, 20a, 21, 21a) in the form of tenons (20, 20a) and mortises (21, 21a), with a bilateral symmetry along said edges, each tenon and mortise of each edge of each board mating with a corresponding, equally dimensioned mortise and tenon, respectively, of another equally dimensioned edge of another board to form a completed container; wherein the overall length (L) of each edge is selected so that said length can be divided mathematically by a desired basic pitch (W) of said elements, leaving a remainder which is other than zero; said elements including in each edge a plurality of said elements (20, 21), odd in number, that have said basic pitch, as well as a pair of outermost, additional elements (20a, 21a) that have a different pitch (W'); wherein the number of said plurality of elements is derived by dividing said overall edge length by said basic pitch to obtain, with the remainder that is other than zero, the highest possible quotient that is an integral multiple of said basic pitch; however, reducing the result of the division by one when the latter yields an even number and modifying the remainder of said result when an even number is yielded, by adding the basic pitch thereto; said different pitch being derived by adding a factor (Z) to said basic pitch, which factor corresponds to half said remainder of the division, all numerical values being integers greater than zero.

4. A packing case comprising boards (19a, 22a) with edges thereon that are provided with a total odd number of successive connecting elements (20, 20b, 21, 21b) in the form of tenons (20, 20b) and mortises (21, 21b), with a bilateral symmetry along said edges, each tenon and mortise of each board mating with a corresponding, equally dimensioned mortise and tenon, respectively, of another equally dimensioned edge of another board to form a completed container; wherein the overall length (L) of each edge is selected so that said length can be divided mathematically by a desired basic pitch (W) of said elements, leaving a remainder which is other than zero; said elements including in each edge a plurality of said elements (20, 21), even in number, that have said basic pitch, as well as a single, centrally disposed, additional element (20b, 21b) that has a different pitch (W''); wherein the number of said plurality of elements is derived by dividing said overall edge length by said basic pitch to obtain, with the remainder that is other than zero, the highest possible quotient that is an integral multiple of said basic pitch; however, reducing the result of the division by one when the latter yields an even number and modifying the remainder of said result when an even number is yielded, by adding the basic pitch thereto; said different pitch being derived by a factor (Y) to said basic pitch, which factor corresponds to said remainder of the division, all numerical values being integers greater than zero.

* * * * *